United States Patent

Singletary

[15] 3,662,087
[45] May 9, 1972

[54] UNIVERSAL CONDUIT CONNECTOR

[72] Inventor: Lloyd G. Singletary, 925 Lilley Ave., Columbus, Ohio 43206

[22] Filed: Nov. 17, 1970

[21] Appl. No.: 90,395

[52] U.S. Cl. ............................ 174/65 R, 174/51, 285/127, 285/169, 285/404
[51] Int. Cl. .......................................................... H02g 3/18
[58] Field of Search ............. 285/404, 169, 161, 90, 127; 174/65 R, 64, 81, 83, 51; 287/52.08

[56] References Cited

UNITED STATES PATENTS

| | | | |
|---|---|---|---|
| 1,831,856 | 11/1931 | Fullman | 285/404 |
| 1,724,131 | 8/1929 | Gavaza | 285/404 X |
| 1,366,851 | 1/1921 | Vibber | 285/127 |
| 2,111,243 | 3/1938 | Hecht | 285/404 |
| 2,455,180 | 11/1948 | Kennedy | 285/404 |
| 1,000,043 | 8/1911 | Scism | 285/404 |
| 562,892 | 6/1896 | Gates et al. | 285/404 X |
| 3,498,645 | 3/1970 | Kowalewski et al. | 285/404 X |

FOREIGN PATENTS OR APPLICATIONS 308,975 10/1955 Switzerland ........................ 285/404

Primary Examiner—Thomas F. Callaghan
Attorney—William D. Hall, Elliott I. Pollock, Fred C. Philpitt, George Vande Sande, Charles F. Steininger and Robert R. Priddy

[57] ABSTRACT

A hollow tubular conduit connector is provided with external threads at one end for thread engaging a conduit fitting, and with an outstanding flange portion for surface engaging the fitting. The connector is also provided with a plurality of like-dimensioned threaded holes extending therethrough and disposed in a circular locus about the connector; and a removable set screw interchangeable between said threaded holes extends through a selected one of said holes to mechanically and electrically engage a section of conduit inserted into the connector.

4 Claims, 3 Drawing Figures

PATENTED MAY 9 1972  3,662,087

INVENTOR
Lloyd G. Singletary

BY Elliot I. Pollock
ATTORNEY

UNIVERSAL CONDUIT CONNECTOR

BACKGROUND OF THE INVENTION

Electrical systems employing conduit of the thin-wall (electrical metallic tubing) or heavywall (rigid) types are often associated with fittings taking the form of a hollow box or receptacle adapted to receive a plurality of conduits, and adapted to permit electrical connections to be made therebetween. In practice, connectors are provided between the conduits and fitting to mechanically hold the conduits in place and, in addition, to make electrical connection to the fitting and to the conduit tubings for grounding purposes.

One known form of conduit connector comprises a threaded sleeve or tubular member adapted to thread engage an opening in the fitting, and provided with an outstanding flange portion designed to surface engage a wall of the fitting when the connector is firmly turned into place, thereby to provide good electrical continuity between the connector and the fitting for grounding purposes. The connector is adapted to receive a section of metallic conduit which is slip fit into the connector; and a set screw extends through a single threaded aperture in the connector for mechanically holding the conduit in place, and for assuring good electrical continuity between the conduit and connector.

While the aforementioned structure operates satisfactorily in some applications, it is often unsatisfactory for use in other applications. More particularly, if the fitting is installed in a corner location, or in a position of limited accessibility, it is sometimes found that when the connector is turned down fully so that its flange portion is in good surface engagement with a cooperating wall of the fitting, the single set screw is, at that time, partially or totally inaccessible. In such cases, it is necessary, and the practice of electricians, to loosen the connector somewhat with respect to the fitting so as to bring the set screw into a position where it can be tightened; and this necessity to loosen the connector can cause a faulty ground connection.

SUMMARY OF THE INVENTION

In accordance with the present invention, an electrical system is provided with a conduit fitting of known type comprising an enclosed receptacle or box having a major opening or access plate to permit access to the interior thereof for making electrical connections between several conduits. The fitting is also provided with at least one circular threaded opening in a wall thereof adapted to receive a threaded conduit connector of hollow tubular configuration; and the connector is in turn adapted to receive a section of metallic conduit in known manner.

The conduit connector of the present invention is provided with a metallic flange portion extending outwardly of and transverse to the axis of said connector, and adapted to firmly engage a surface of the fitting when the threaded end of the connector is in thread engagement with the fitting. In addition, the connector is provided with a plurality of like-dimensioned threaded holes (preferably four such holes) which are disposed in substantially equally spaced relation to one another in a substantially circular locus extending around the connector at a position remote from the aforementioned threaded end and outstanding flange; and a removable set screw member is provided which is interchangeable between each of the threaded holes in said circular locus.

By the aforementioned arrangement, when the threaded connector is turned all the way down into thread engagement with the fitting, to an extent sufficient to achieve good surface contact and electrical continuity between the outstanding connector flange and fitting, at least one of the aforementioned threaded holes will be accessible for reception of a set screw regardless of the location in which the fitting installation is made. As a result, the set screw can be inserted into an accessible hole in the connector, and into good mechanical and electrical connection with conduit inserted into the connector, without requiring that the connector be loosened from the fitting. Conduit may accordingly be installed much more rapidly than has been the case heretofore, particularly in corner or other "tight" locations and, at the same time, positive grounding is assured regardless of the location of the installation.

DESCRIPTION OF THE PREFERRED EMBODIMENTS

Figure 1:
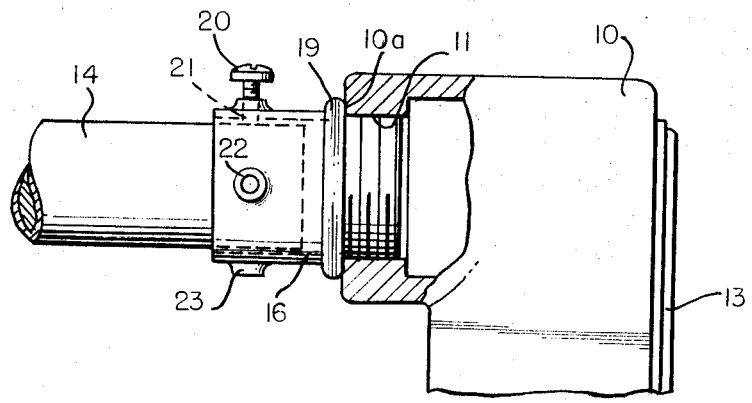
FIG. 1 is a side view, in partial section, of an electrical conduit installation constructed in accordance with the present invention.

In accordance with the present invention, an electrical system for the installation of conduit includes a conduit fitting 10 taking the form of a hollow box or receptacle. The particular fitting shown in FIG. 1 is L-shaped and includes threaded orifices 11 and 12, adapted to receive conduit connectors, with the axes of said orifices 11 and 12 extending at substantially right angles to one another. It should be understood that this particular fitting is intended to be illustrative only; and the principles of the present invention are equally applicable to fittings of different configuration, and are indeed, applicable to use in conduit box connectors rather than conduit fittings.

Fitting 10 includes an access plate 13 adapted to be removed so as to permit the making of, and access to, electrical connections within the fitting. These connections comprise connections between the conductors of two conduit sections 14 and 15 disposed (in the particular embodiment shown in FIG. 1) at substantially right angles to one another.

Mechanical and electrical connections are made between the conduits 14 and 15, and fitting 10, through the agency of a pair of conduit connectors 16 and 17. These conduit connectors may be of the same or different sizes; but except for dimensional considerations, are structurally and operationally identical.

Figure 2:
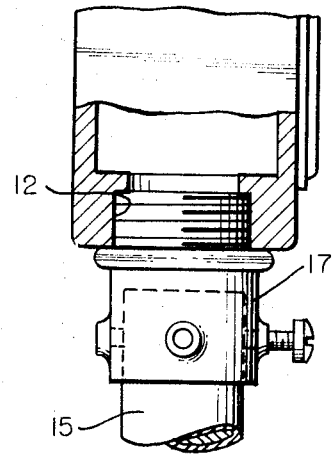
FIG. 2 is a side view of an improved conduit connector constructed in accordance with the present invention.
Figure 2:
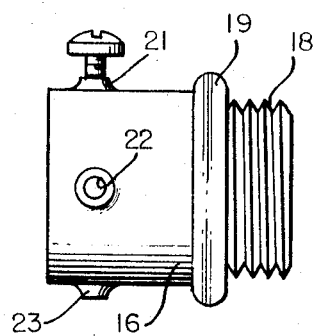
Figure 3:
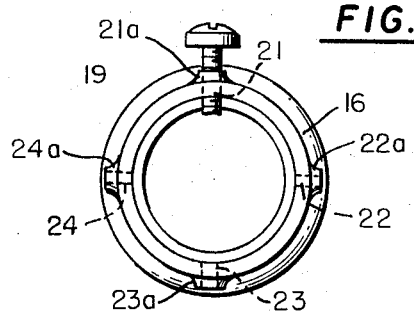
FIG. 3 is an end view of the connector of FIG. 2.

A typical one of the connectors 16 is illustrated in further detail in FIGS. 2 and 3. The connector takes the form of a sleeve or cylindrical tubular member one end of which is provided with external threads 18 adapted to thread engage a corresponding opening (e.g., 11) in the fitting 10. The connector is formed with an outstanding flange portion 19 which is pressed outwardly from the tubular fitting and which extends beyond the outer diameter of threads 18 so that when the connector is turned down as far as it can go in thread engagement with its associated fitting opening, the flange 19 comes into firm surface engagement with a corner portion 10a of the fitting 10. This assures that good electrical continuity is achieved between the connector 16 and its associated fitting 10.

The other end of the connector 16, on the side of flange 19 opposite to threads 18, is unthreaded in configuration and is adapted to receive a conduit section (such as 14) which is slipped into place therein. In order to hold the conduit in place within its associated connector, and to achieve good electrical and mechanical connection between the connector and conduit, a set screw 20 is threaded through a threaded aperture in the wall of the connector, in a direction transverse to the axis of the connector, and into firm engagement with the wall of conduit 14 inserted into the connector.

For the reasons already described, it is sometimes impossible to manipulate a set screw such as 20 without loosening the connector and thereby impairing the electrical continuity between flange 19 and corner 10a of fitting 10. In order to facilitate installation of conduit in "tight" locations, and to assure that the electrical continuity between flange 19 and the fitting 10 need not be disturbed, the connector of the present invention is provided with a plurality of set screw holes substantially equally spaced from one another in a circular locus surrounding the connector. In the preferred embodiment constructed in accordance with the present invention, four such set screw holes are provided, i.e., holes 21-24 inclusive (see FIG. 3) spaced from one another by substantially 90°. It will be appreciated, however, that other numbers and spacings of holes may be provided, e.g., three such holes spaced by substantially 120° from one another, six such holes spaced by substantially 60°, etc.; but the four-hole embodiment illustrated in FIG. 3 has been found in practice to give greatest assurance of accessibility under all possible conditions of operation without weakening the connector wall (which might otherwise occur if an excessive number of holes are employed).

The several holes 21-24 are all of like dimension, and they are each adapted to receive set screw 20. Set screw 20 is removable from the connector, and is designed for insertion into a selected one of the holes 21-24, as dictated by the accessibility of the holes once an installation has been made. The holes can be individually surrounded by bosses pressed outwardly from the body of the tubular connector, e.g., as at 21a-24 (FIG. 3).

To effect a conduit installation, the set screw 20 is first removed from the connector. The connector (e.g., 16) is then threaded into place in the fitting, and turned down to an extent sufficient to assure firm surface contact between the flange or abutment 19 of the connector, and the adjacent wall of the fitting. Regardless of the location of the conduit installation, and the extent to which the connector must be turned down to assure this surface contact, at least one of the set screw holes 21-24 will be accessible for receipt of set screw 20. When conduit is slipped into the fitting, the set screw 20 may accordingly be inserted into the accessible one (or selected accessible one) of the set screw holes 21-24, and turned down into firm mechanical and electrical connection with the conduit.

Having thus described my invention, I claim:

1. In an electrical system wherein accessibility is limited because of surrounding structure such as in a corner or other tight location, a conduit fitting comprising an enclosed receptacle having at least one circular threaded opening in a wall thereof, a conduit connector of hollow tubular configuration having external threads at one end thereof, said connector including an integral outwardly extending abutment located at a position between the ends of said connector closely adjacent to the threads on said connector, the major portion of said connector being external of said receptacle with the threaded end of said connector thread engaging said threaded opening and being turned down in said opening to the maximum possible extent to cause said integral abutment to be in firm surface engagement with the external surface of said fitting wall adjacent to said threaded opening for assuring positive electrical continuity between said fitting and said connector, the angular position of said conduit connector relative to said receptacle being determined entirely by the mating threads on said connector and opening and the relative positions of said mating threads when said abutment firmly engages said fitting wall, said tubular connector defining a plurality of like-dimensioned threaded holes extending through the wall of said connector in a circular locus coaxial with the axis of said tubular connector and located in substantially equally spaced relation to one another around the periphery of said connector at a position between said abutment and the end of said connector opposite to said threaded end, and a single removable set screw member interchangeable between said threaded holes and extending through the tubular wall of said connector in thread engagement with a selected accessible one of said holes for mechanical and electrical engagement with a section of conduit inserted into said opposite end of said connector and wherein at least one of said threaded holes is inaccessible because of its location to surrounding structure.

2. The structure of claim 1 wherein said plurality of threaded holes consists of four threaded holes angularly spaced by 90° from one another.

3. The structure of claim 1 wherein said integral abutment comprises a circular flange pressed outwardly from said hollow tubular connector.

4. The structure of claim 1 wherein said conduit fitting includes two circular threaded openings spaced from one another in the walls of said fitting, and a pair of said conduit connectors thread engaging said two openings respectively.

* * * * *